United States Patent [19]

Ward

[11] Patent Number: 4,608,658
[45] Date of Patent: Aug. 26, 1986

[54] METHOD AND APPARATUS FOR REMOVING NOISE AT THE ENDS OF A STROKE CAUSED BY RETRACING

[75] Inventor: Jean R. Ward, Arlington, Mass.

[73] Assignee: Pencept, Inc., Waltham, Mass.

[21] Appl. No.: 599,989

[22] Filed: Apr. 13, 1984

[51] Int. Cl.[4] ............................................. G08C 25/00
[52] U.S. Cl. ..................................... 364/574; 382/54; 382/13; 178/18
[58] Field of Search ............... 364/574, 724, 572, 518, 364/520; 382/57, 60, 54, 13; 178/18, 19

[56] References Cited

U.S. PATENT DOCUMENTS

| | | | |
|---|---|---|---|
| 4,206,314 | 6/1980 | Prugh et al. | 364/520 X |
| 4,284,975 | 8/1981 | Odaka | 340/146.3 |
| 4,319,331 | 3/1982 | Elbaum et al. | 364/518 X |
| 4,375,081 | 2/1983 | Blesser | 340/146.3 |
| 4,424,570 | 1/1984 | Imazeki et al. | 364/520 |
| 4,467,432 | 8/1984 | Imazeki et al. | 364/520 X |
| 4,534,060 | 8/1985 | Ward | 382/54 |

Primary Examiner—Edward J. Wise
Attorney, Agent, or Firm—Robert F. O'Connell; Robert M. Asher

[57] ABSTRACT

A method and apparatus are described for processing a series of digital signals representing a stroke of a stylus on a tablet to remove signals at the ends of the stroke caused by retracing, the series of signals corresponding to the X and Y coordinates of a series of points along the direction of travel of the stroke. The signals for each point in the series are compared to the signals of the points adjacent to it to form a second series of signals which contain only those signals corresponding to points having an ordinate value more extreme than the corresponding ordinate value of its adjacent points. The first three points in the second series of signals are then processed to determine the ratio of the distance from the first point to the second point to the distance from the second point to the third point and to determine the size of the angle formed by the three points. The distance ratio is fed into a table-look-up which outputs a reference angle signal which is compared to the processed angle signal. If the processed angle signal is less than the reference angle, the second point in the second series is used as the end point and all points in the first series before that point are discarded as being caused by retracing. In the processed angle is equal to or greater than the reference angle, the first point in the second series is used as the end point. The last three points in the second series are processed in a similar manner to determine the correct end point at the finish of the stroke. If the second series of signals consists of only two points, further processing is not performed since each one of the two points is an end point of the stroke.

8 Claims, 4 Drawing Figures

FIG. 1

PEAK DETECTOR 21

FIG. 3

DIFFERENCE CALCULATOR 31

ANGLE CALCULATOR 33

FIG. 5

METHOD AND APPARATUS FOR REMOVING NOISE AT THE ENDS OF A STROKE CAUSED BY RETRACING

BACKGROUND OF THE INVENTION

The present invention relates generally to signal processing systems and more particularly to a method and apparatus for processing a series of digital signals representing a stroke of a writing instrument, such as a stylus, on a writing surface, such as a digitizing tablet, to remove signals at the ends of the stroke caused by retracing.

In many applications a digitizing tablet is used to convert pen or stylus motion into a set of electrical data which is then processed by digital equipment. Typically, there is a special electronic or electromagnetic grid or surface which detects the X and Y positions of the pen as it moves along the surface at a periodic rate. The information is present as two digital data words at a periodic clock rate. This class of technology is used for signature verifications, automatic drafting, graphics, character recognition and so forth. In each case, the user writes on the writing surface with the writing instrument and the position is monitored electronically.

In connecting such a device directly to a processing system there are problems because the raw data may contain certain kinds of noise of other defects which can adversely effect applications that process the data for editing, character recognition, graphics and other uses. The noise may be electrical or mechanical noise produced by the equipment employed to generate the sequence of signals corresponding to the stroke of the writing instrument. The noise may also be natural noise produced by the writer if he retraces a portion of the stroke at either end.

For example, instead of forming the left leg in an upper case letter N by starting at the bottom left and moving the writing instrument upward the writer may start at the top left and make a "down" line first and then an "up" line which is more or less over or very close to the "down" line. As can be appreciated, in a character recognition system this latter method of writing the letter N may, when processed, produce an upper case letter W. Furthermore, in graphics applications portions of strokes caused by retracing will detract from the intended shape of the resulting image.

As can be appreciated, it would be desirable to be able to detect and remove data signals at the ends of a stroke which are caused by retracing.

In U.S. Pat. No. 4,375,081 to B. Blesser there is described a technique for removing or minimizing noise over the length of a stroke caused by writing slowly. The technique comprises filtering a signal represented by a first series of indicia where each indicium of the series represents an amplitude by serially averaging the amplitudes of sets of n indicia of the series to form a second series of indicia and serially amplitude comparing each subsequently occurring indicium thereof to form a third series of indicia which includes those indicia resulting from comparisons having an amplitude difference greater than a predetermined amount.

In U.S. Pat. 4,284,975 to K. Odaka there is disclosed a pattern recognition system for hand-written characters operating on an on-line basis comprising a character input unit for providing the coordinates of a plurality of points on strokes of a hand-written input characters, an approximate unit for providing some feature points for each stroke of the input character, a pattern difference calculator for providing the sum of the length between the feature points of the input character and those of the reference characters which are stored in the reference pattern storage, and a minimum difference detector for determining the mimimum value of the difference among the pattern differences thus calculated and determining the input character as the reference character which provides the minimum difference.

As far as is known, nothing has been done in the past to eliminate noise caused by retracing.

It is an object of this invention to provide a new and improved technique for processing a series of signals representing a stroke of a writing instrument on a surface to remove noises which may be present at the start and finish of the stroke.

It is another object of this invention to provide a new and improved technique for processing a series of signal representing a stroke of a writing instrument on a surface to remove noise which may be present at the start and finish of the stroke caused by retracing.

It is still another object of this invention to provide a new and improved technique for processing a series of signals representing a stroke of a writing instrument on a surface to determine whether any of the signals at the ends are as a result of retracing.

It is yet still another object of this invention to provide a new and improved technique for processing a series of signals representing a stroke of a writing instrument on a surface to remove noise which may be present at the start and finish of the stroke caused by retracing which is not dependent on the rate at which the signals representing points aong the stroke are sampled and does not require that the points be uniformly spaced from one another.

It is a further object of the invention to provide a technique as described above which does not alter the signals between the points determined to be the end points.

SUMMARY OF THE INVENTION

A method of processing a series of electrical signals representing a stroke of a writing instrument on a recording medium to remove signals caused by retracing at the start and finish of the stroke according to the teachings of the present invention comprises first comparing the signals in the series relative to each other to form a second series of signals, the second series of signals comprising only signals corresponding to local extrema points of the stroke. The first three points in the second series of signals are then processed to determine the ratio of the distance from the first point to the second point to the distance from the second point to the third point and to determine the size of the angle formed by the three points. The distance ratio is fed into a table-look-up which outputs a reference angle signal which is compared to the processed angle signal. If the processed angle signal is less than the reference angle, the second point in the second series is used as the end point and all points in the first series before that point are discarded as being caused by retracing. If the processed angle is equal to or greater than the reference angled, the first point in the second series is used as the end point. The last three points in the second series are processed in a similar manner to determine the correct end point at finish of the stroke. If the second series of signals consists of only two points, further processing is not performed since each one of the two points must be one of the end points.

An apparatus for processing a series of electrical signals representing a stroke of a writing instrument on a recording medium to remove signals caused by retracing at the start or finish of the stroke according to the teachings of the present invention comprises means for comparing said signals in said first series relative to each other to form a second series of signals, said second series of signals comprising only signals corresponding to local extrema points of said stroke, means for measuring the size of the angle defined by the first three local extrema points in said second series, means for determining a reference angle which is related to the distances from the first local extrema point to the second local extrema point and from the second local extrema point to the third local extrema point, means for comparing the measured angle with the reference angle, and means for removing all signals in said first series corresponding to points before the second local extrema point if the measured angle is less than the reference angle.

Various features and advantages will appear from the description to follow. In the description, reference is made to the accompanying drawing which forms a part thereof, and in which is shown by way of illustration, a specific embodiment for practicing the invention, this embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

The present invention is directed to a technique for processing a series of signals representing a stroke of a writing instrument on a writing surface to remove signals at the start and finish of the stroke which are caused by retracing. The invention accomplishes this by first determining the local extrema points of the stroke and then determining at each end of the stroke whether the first local extrema point or the second local extrema point is the actual end point of the stroke. The technique for determining which local extrema point is the actual end point involves taking the ratio of the distance from the first local extrema point to the record local extrema point to the distance from the second local extrema point to the third local extrema point and measuring the size of the angle defined by the three local extrema points. If the measured angle is less than a reference angle that is assigned for a particular distance ratio then the second local extrema point is used as the end point and all points before that point discarded as being caused by retraces. If the measured angle is greater than or equal to the assigned angle then the first local extrema point is used as the actual end point. A new series of signals is then generated starting with the signal corresponding to the local extrema point that has been determined to be the end point at one end of the stroke using all intermediate points and terminating with the signal corresponding to the local extrema point that has been determined to be the end point at the other end of the stroke.

The apparatus for carrying out the technique includes a stroke input unit, a local extrema separator unit, a pair of end point detection units, a stroke input unit and a control unit. The stroke input unit is used to obtain a first series of data signals corresponding to points detected along the stroke. The local extrema separator unit is used to generate from the first series of points a second series of points which are only local extrema points. The end point detection units are used to process the series of local extrema points to determine if there is any retrace at the ends of the stroke. The stroke output unit is used to store the processed data signals and the control unit is used to control the overall operation of the apparatus.

Although the invention will hereinafter be described in connection with processing a series of digital signals produced by the stroke of a stylus on a digitizing tablet it is to be understood that the invention may also be used in connection with processing a series of analog signals representative of the stroke of a writing instrument on a surface and that the series of signals representing points along the stroke may be obtained by other means, such as electrooptically (using a light pen or a laser bean and a photoconductive surface) rather than electronically.

Figure 1:
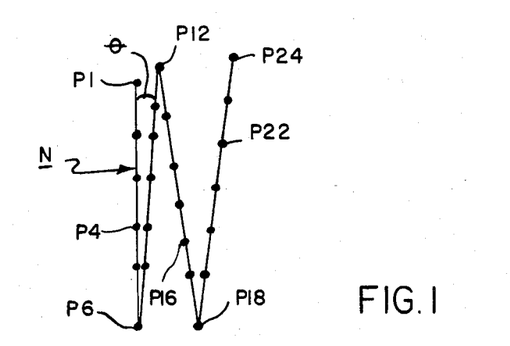
FIG. 1 is an example of a stroke useful in explaining the invention.

Referring now to the drawings there is illustrated in FIG. 1 an example of a stroke N useful in explaining the invention. The stroke is intended to represent the upper case letter N and is represented by twenty-four positions or points. For simplicity only some of the points are shown and labelled. The stroke is shown as made up of four legs portions. Point P1 is the point at the first or starting end of the stroke and point P24 is the point at the second or finising end of the stroke. The portion of the stroke from points P1 to P6 is produced or caused by retrace (i.e. making a "down" line first and then an "up" line for the left leg rather than simply an "up" line). The portion is not intended to be a separate leg in the stroke being drawn but rather is intended to be aligned with the second leg.

The present invention provides a technique for determining whether any points in a stroke are caused by retrace and then removing from the stroke that portion which is attributed to retrace.

Figure 2:
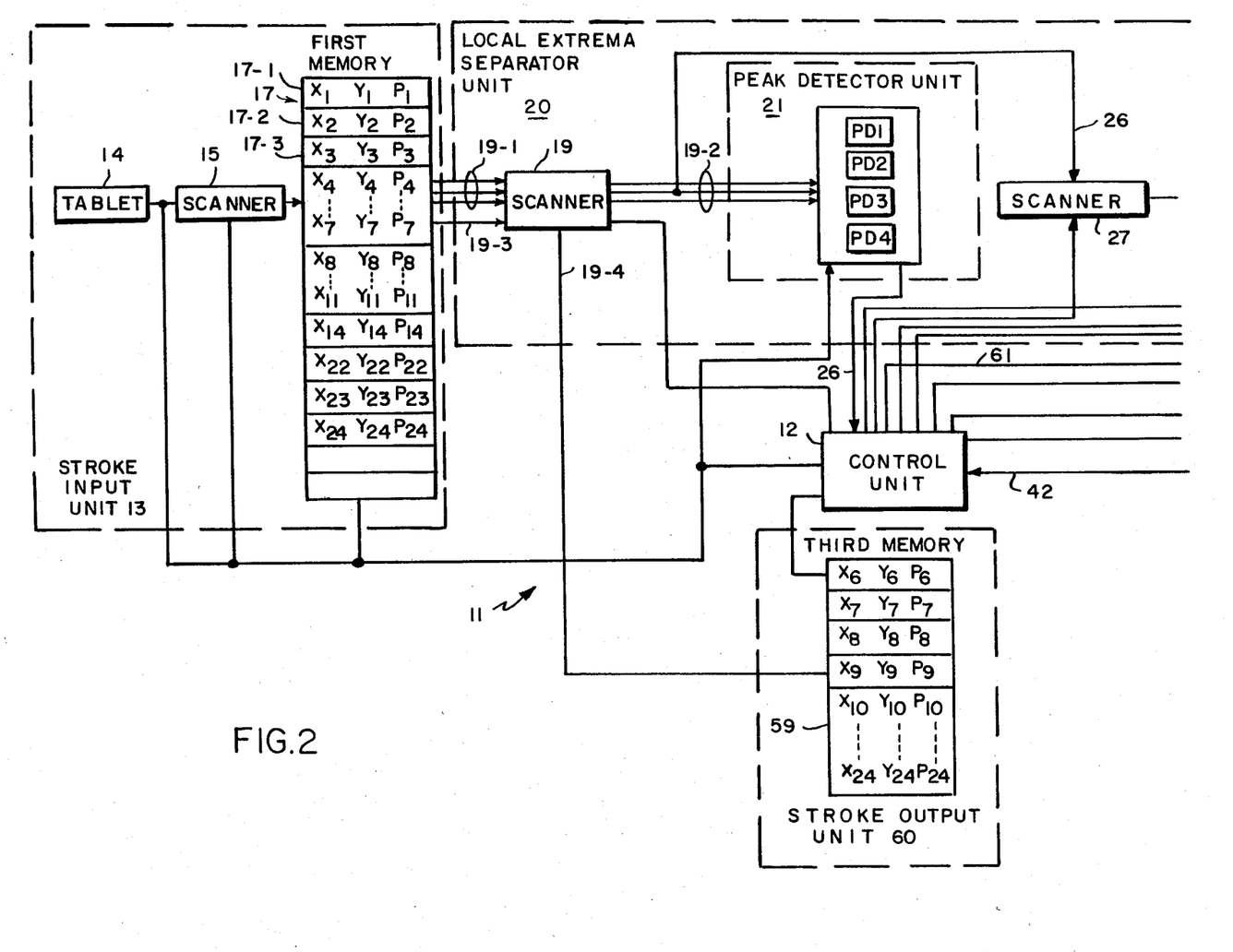
FIG. 2 is a block diagram of a system constructed according to the teachings of the present invention.

Referring now to FIG. 2, there is illustrated a system utilizing the teachings of the present invention and identified generally by reference numeral 11.

System 11 includes a control unit 12 which controls the overall operation of system 11.

System 11 further includes a stroke input unit 13 having a digitizing tablet 14 which periodically emits two dimentional digital values representing the X and Y positions of a stylus (not shown) making a stroke across its surface. Thus, X1 and Y1 represent the X and Y coordinates of the stylus at the first point P1 of the stroke, X2 and Y2 represent the X and Y coordinates of the second point P2 of the stroke, X3 and Y3 represented the X and Y coordinates of the third point P3 of the stroke and so forth.

The points representing the stroke are preferably uniformly spaced from one another, either temporally or spatially.

The digital signals corresponding to the X and Y values of each point P1 through P24 are stored in succession by a scanner 15 into successive locations in a first memory 17, which may be a random access type memory. Thus, point P1 is stored in the first location 17-1, point $P_2$ is stored in the second location 17-2 and point $P_3$ is stored in the third location 17-3 and so forth.

The data obtained by stroked input unit 13 and stored in first memory 17 is then processed by a local extrema or separator unit 20 which produces a series of data signals corresponding to local extrema points only. First the data in first memory 17 is fed in succession by a second scanner 19 into a peak detector unit 21 which processes the data to identify the signals corresponding to those points which are identified as local extrema points.

The implementation of peak detector unit 21 is dependent on the definition used for a local extrema point and the points identified by peak detector unit 21 as local extrema points may be different for different definitions of a local extrema point.

A local extrema point may be defined as a point along the stroke having a more extreme value (in either the X or the ordinate) than either one of the points adjacent to it. As can be appreciated, first point detected in the stroke will always be one of the local extrema points since there is no point preceeding it. Similarly, the last detected point in the stroke will also always be one of the local extrema points since there is no point following it. As another difinition, a local extrema point may be identified as a point which is at a greater radial distance from the point at one end of the stroke than the points on either side of it. The first and last points will also always be local extrema points under this definition.

In the embodiment of the invention shown the first definition of a local extrema point is employed.

Scanner 19 scans the locations in memory 17 successively, three locations at a time, except in the first and last instances, and feeds the data scanned into peak detector unit 21. Scanner 19 has three inputs legs 19-1 which are ganged together and three output legs 19-2 which are also ganged together. Each one of the input legs 19-1 has three ganged contact elements. One element scans the cells in memory 17 containing the X data, another one of the elements scans the cells in memory 17 containing the Y data and the third element scans the cells in memory 17 containing the point number data. Each one of the output legs 19-2 also has three corresponding ganged contact elements, one for transmitting X data, another for transmitting Y data and the third for transmitting point number data. For simplicity the individual contact elements in each leg of legs 19-1 and 19-2 are not shown. Scanner 19 also includes a fourth input leg 19-3 having three ganged contact elements and a fourth output leg 19-4 having four ganged contact elements.

Peak detector unit 21 is implemented by four peak detectors labelled PD1, PD2, PD3 and PD4. Peak detector PD1 receives the three signals transmitted along the three output legs 19-2 of scanner 19 from the contact elements in legs 19-1 scanning the X components and determines if the X component of the signal along the middle leg is greater than the X component of the signal transmitted along the top leg and also greater than the signal transmitted along the bottom leg. Peak detector PD2 receives the same three signals and determines if the X component of the signal in the middle leg is less than the signal in the top lega and also less than the signal in the bottom leg. Peak detectors PD3 and PD4 perform similar functions for the Y coordinates of the signals transmitted along the three legs.

First, scanner 19 is set so that the top leg of legs 19-1 is not over a cell, the middle leg is at the cell having point $P_1$ and the bottom leg is at the cell having point $P_2$. The scanner 19 is set so that the three input legs 19-1 are at locations containing points $P_1$, $P_2$ and $P_3$, then so that the three input legs 19-1 are at locations containing points $P_2$, $P_3$ and $P_4$, then at points $P_3$, $P_4$ and $P_5$ and so forth. In the last instance the upper leg of legs 19-1 is at point $P_{22}$, the middle leg is at point $P_{23}$ and the bottom leg is not over a cell location. Thus each point may be compared to its adjacent points.

Figure 3:
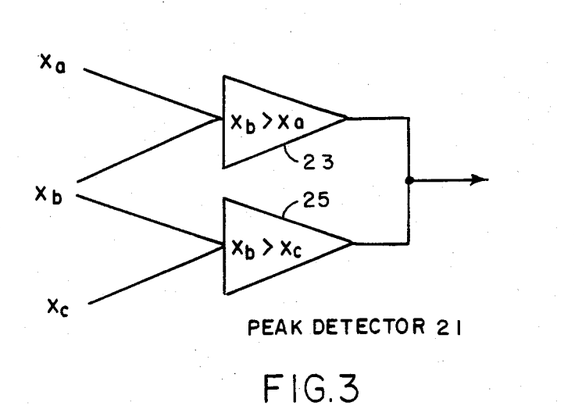
FIG. 3 is a block diagram of one of the peak detectors in the peak detector unit shown in FIG. 2.

As can be seen in FIG. 3, peak detector PD1 includes a pair of comparators 23 and 25. Comparator 23 compares the X value of the first point Xa (the point transmitted in the upper leg of legs 19-2) with the X value of the second point Xb (the point transmitted in the middle leg Xb) to see if the X value of the second point is greater than the X value of the first point. Comparator 25 determines if the X coordinate of the second point Xb is greater than the X value of the third point. Peak detector PD2 is similar in construction to peak detector PD1 but is connected to determine if the X value of the signal in middle leg is less than the X value of the signals transmitted in with the top and bottom legs. Peak detectors PD3 and PD4 are identical to peak detectors PD3 and PD4 are identical to peak detectors PD1 and PD2 respectively.

Each point that meets the requirements of any one of peak detectors PD1 through PD4 (i.e. has either an X component or a Y component that is either greater than or less than the corresponding components in either point adjacent to it, for any one of the scanner settings) constitutes a local extrema point. A signal indicating this is sent by peak detector unit 21 to control unit 12. Control unit 12 causes scanner 19 to transmit that point over line 26 to scanner 27. Points received by scanner 27 are fed into successive cell locations in a second memory 29 starting with the first cell location. As can be seen, the first and last points in the stroke will always be identified as local extrema points. In the stroke shown in FIG. 1, points $P_1$, $P_6$, $P_{12}$, $P_{18}$ and $P_{24}$ are determined by peak detector unit 21 to be local extrema points and are stored accordingly in succession in second memory 29. Points that are not local extrema are not stored in second memory 29. Thus, second memory 21 contains only points $P_1$, $P_6$, $P_{12}$, $P_{18}$ and $P_{24}$. These points are in cell locations 29-1, 29-2, 29-3, 29-4 and 29-5 respectively. Second memory 29 may also be a random access memory.

The first three points stored in second memory 29, are then processed in an end point detection unit 30 to determine whether point $P_1$ or point $P_6$ is the end point at the first end or start of the stroke.

The signal stored in the first location 29-1 in second memory 29 (i.e. point $P_1$) is fed into a first difference calculator 31 and into an angle calculator 33. The signal stored in the second location 29-2 in second memory 29

(i.e. point $P_6$) is fed into first difference calculator 31, into a second difference calculator 35 and into angle calculator 33. The signal stored in the third location 29-3 in second memory 29 (i.e. point $P_{12}$) is fed into second difference calculator 35 and angle calculator 33. A line 36 also connects the third memory location in second memory 29 to control unit 12.

First difference calculator 31 measures the distance from the point in the first memory location 29-1 to the point in the second memory location 29-2. Second difference calculator 35 measures the distance from the point in the second memory location 29-2 to the point in the third memory location 29-3. Angle calculator 33 measures the size of the angle defined by the three points in the first three memory locations. Thus, in the example shown in FIG. 1 difference calculator 31 measures the distance from point $P_1$ to point $P_6$ i.e. $\overline{P_1P_6}$, difference calculator 35 measures the distance from point $P_6$ to point $P_{12}$ i.e. $\overline{P_6P_{12}}$ and angle calculator 33 measures angle $\theta$.

The outputs of difference calculators 31 and 35 are fed into a ratio calculator 37 which divides the output from difference calculator 31 by the output from difference calculator 35. Ratio calculator 37 may be a "divide-by" unit.

The output of ratio calculator 37 is fed into a table-look-up 39 which outputs a reference angle signal which varies according to the applied input. Table-look-up 39 contains a set of angle values, each value being related to a range of ratios, and varying inversely to the size of the ratio. For example, if the input ratio to table-look-up is between 1 and 0.9 the output angle signal may correspond to 5° and if the input ratio is between 0.9 and 0.8 the angle signal may be 7°.

The output of table look up 39 is fed into a comparator 41.

Angle calculator 33 calculates the size of the angle defined by the points in cell locations 29-1, 29-2 and 29-3 with the point in cell location 29-2 being the vertex of the angle. The output of angle calculator 33 is also fed into comparator 41.

Comparator 41 compares the signals received from table-look-up 39 and angle calculator 33. If the signal received from angle calculator 33 is greater than the signal from table-look-up 39 then the point in the first cell location 29-1 is the correct end point and there are no points determined to be caused by retrace (at that end). On the other hand, if the signal received from angle calculator 33 is equal to or less than the signal from table-look 39 then the point in the second cell location 29-2 is the correct end point and all points before that point are determined to be caused by retracing.

Thus, in essence, the technique for determining retrace involves calculating the ratio of the distances from the first and second and second and third local extrema points and then determining if the angle defined by those three points is greater than that angle then there is no retrace and if it is less than that angle there is retrace.

A signal indicating this is sent to control unit 12 over line 42.

Figure 4:
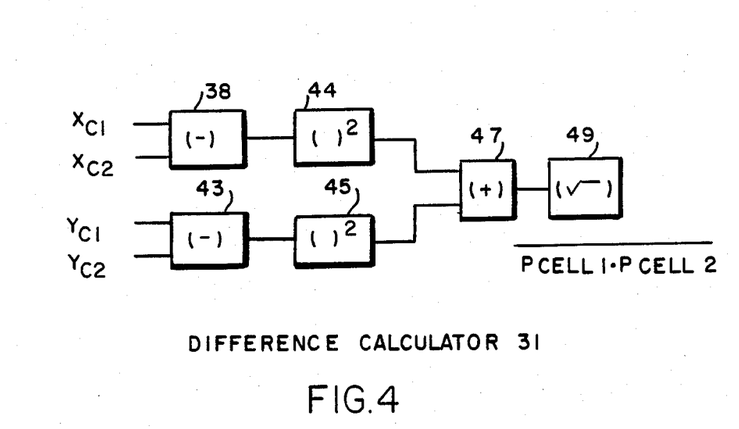
FIG. 4 is a block diagram of one of the difference calculators shown in FIG. 2.

Difference calculator 31, which is shown in more detail in FIG. 4 includes a subtractor 38 which subtracts the X value $X_{c2}$ of the point in cell 29-2 from the X value $X_{c1}$ in cell 29-1, a squarer 44 which squares the output of subtractor 38, a subtractor 43 which subtracts the Y value $Y_{c2}$ of the point in cell 29-2 from the Y value $Y_{c2}$ of the point scanner in cell 29-1 and a squarer 45 which squares the output of subtractor 43. An adder 47 sums the outputs of squarers 44 and 45 and a square root circuit 49 calculates the square root of the output of adder 47. Difference calculator 35 is square root of the output of adder 47. Difference calculator 35 is identical to difference calculator 31 but performs the calculations for the points in cell locations 29-2 and 29-3.

Angle calculator 33 calculates the angle $\theta$ defined by the points in cell locations 29-1, 29-2 and 29-3 using the formula:

$$\text{ARC COS } B = \frac{c^2 + a^2 - b^2}{2\,ac}$$

where:
"B" is the angle defined by the points in cell locations 29-1, 29-2 and 29-3,
"a" is the distance from th point in cell location 29-2 to the point in cell location 29-3,
"b" is the distance from the point in cell location 29-1 to the point in cell location 29-3, and
"c" is the distance from the point in cell location 29-1 to the point in cell location 29-2.

Figure 5:
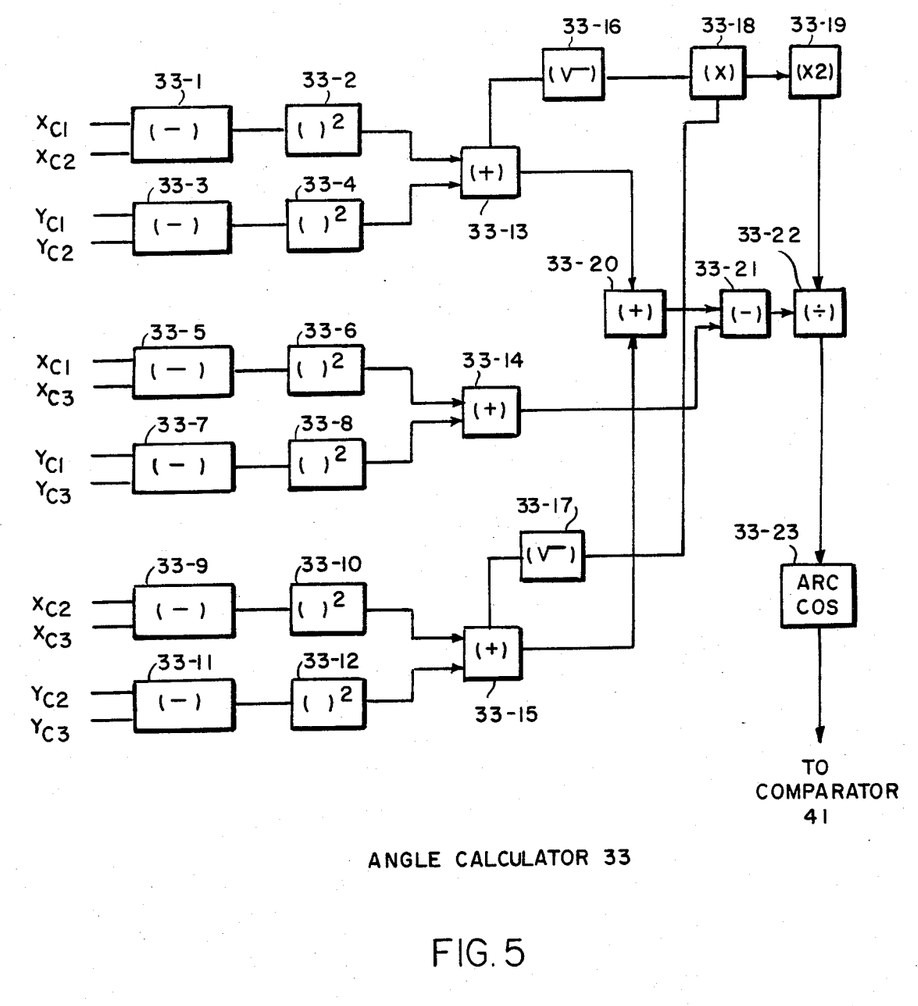
FIG. 5 is a block diagram of the angle calculator shown in FIG. 2.

An implementation of angle calculator 33 is shown in FIG. 5.

Angle calculator 33 includes a subtractor 33-1 which subtracts the X value $X_{c2}$ of the point loaded into it from cell 29-2 from the X value $X_{c1}$ of the point loaded into it from cell 29-1 and a squarer 33-2 which squares the output of subtractor 33-1. Subtractor 33-3 and squarer 33-4, subtractor 33-5 and squarer 33-6, subtractor 33-7 and squarer 33-8, subtractor 33-9 and squarer 33-10, subtractor 33-11 and squarer 33-12 perform similar operations on points $Y_{c1}$ and $Y_{c2}$, $X_{c1}$ and $X_{c2}$, $Y_{c1}$ and $Y_{c3}$ $X_{c2}$ and $X_{c3}$ and $Y_{c2}$ and $Y_{c3}$, respectively. Adder 33-13 sums the outputs of squares 33-2 and 33-4. Adders 33-14 and 33-15 perform similar operations on squarers 33-6 and 33-8 and 33-10 and 33-12, respectively. A square root circuit 33-16 takes the square root of the output of adder 33-13 and a square root circuit 33-17 takes the square root of the output of adder 33-15. Multiplier 33-18 multiplies the outputs of circuits 33-16 and 33-17. Multiplier 33-19 multiplies the output of multiplier 33-18 by 2. The outputs of adders 33-13 and 33-15 are summed by adder 33-10. The output of adder 33-14 is subtracted from the output of adder 33-20 in a subtractor 33-21. The output of multiplier 33-17 is divided by the output of subtractor 33-21 in a divider 33-22. The arc cos of the output of divider 33-22 is then calculated in a table-look-up 33-23.

The end point at the other end or finish of the stroke is determined in a manner similar to that used in determining the end point at the start of the stroke, using another end point detection unit 50 and a scanner 51. Scanner 51 is needed since the cells in memory 29 in which the last three local extrema points are loaded will depend on the number of local extrema points in the stroke. End point detection unit 50 in identical to end point detection unit 30.

Control unit 12 then instructs scanner 19 to scan first memory 17 with leg 19-3 using the correct starting point and terminating at the correct finishing point. For the stroke shown in FIG. 1, the first point is point $P_6$ and the last point is point $P_{24}$. The data so obtained is then fed by scanner 19, using leg 19-4, into successive locations in a third memory 59, in stroke output unit 60, which may also be a random access memory. Thus, third memory 59 comprises only points $P_6$ through $P_{24}$. As can be appreciated, third memory 21 contains the data of the points of the stroke with the corrected end points. The data contained in third memory 59 may then be further processed as desired and/or stored and/or displayed.

If there are less than three local extrema points in second memory 29 (i.e. no point is stored in the third memory location) a signal to this effect is sent to control unit 12 over line 61. Control unit 12 then instructs scanner 19 to use the first point in memory 17 as the starting point and the last point in memory 17 as the finising point since processing to determining if there is retracing is not needed.

Instead of using separate sub-systems to find the end point at each end a single sub-system may be employed which would first locate the end point at one end and then locate the end point at the other end, using appropriate switches and so forth.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method of processing a first series of signals representing a stroke of a writing instrument on a writing surface to remove signals at the start of the stroke caused by retracing, said first series of signals corresponding to the X and Y coordinates of a series of points along the length of travel of the stroke, the method comprising:
    a. comparing said signals in said first series relative to each other to form a second series of signals, said second series of signals comprising only signals corresponding to local extrema points of said stroke,
    b. measuring the size of the angle defined by the first three local extrema points in said second series
    c. determining a reference angle which is related to the distances from the first local extrema point to the second local extrema point and from the second local extrema point to the third local extrema point,
    d. comparing the measured angle with the reference angle, and
    e. removing all signals in said first series corresponding to points before and second local extrema point if the measured angle is less than the reference angle.

2. The method of claim 1 and wherein said first series of signals are digital signals.

3. The method of claim 1 and wherein comparing said signals in said first series relative to each other to form a second series of signals comprises determining each point in said first series having a more extreme ordinate value than either point adjacent to it.

4. The method of claim 3 and wherein determining the reference angle comprises:
    a. measuring the distance from the first local extrema point to the second local extrema point,
    b. measuring the distance from the second local extrema point to the third local extrema point,
    c. determing the ratio of the distances, and
    d. feeding the ratio of the distances into a table look up, the output of the table look corresponding to the reference angle.

5. Apparatus for processing a first series of signals representing a stroke of a writing instrument on a writing surface to remove signals caused by retracing at an end of the stroke, said first series of signals corresponding to the x and y coordinates of a series of points along the length of travel of the stroke, said apparatus comprising:
    a. means for comparing said signals in said first series relative to each other to form a second series of signals, said second series of signals comprising only signals corresponding to local extrema points of said stroke,
    b. means for measuring the size of the angle defined by the first three local extrema points in said second series,
    c. means for determining a reference angle which is relative to the distances from the first local extrema point to the second local extrema point and from the second local extrema point to the third local extrema point,
    d. means for comparing the measured angle with the reference angle, and
    e. means for removing all signals in said first series corresponding to points before and second local extrema point if the measured angle is less than the reference angle.

6. The apparatus of claim 5 and wherein said means for comparing said signals in said first series relative to each other to form a second series of signals comprises a peak detector unit for determining the X and Y coordinates of three successive points at a time and producing an output signal corresponding to the second of such points if either its X or Y coordinate is more extreme than the X and Y coordinates of the first and third points.

7. Apparatus for use in processing a first series of digital signals emitted by a digitizing tablet representing the portions of a stylus during a stroke on the tablet to minimize noise at an end of the stroke caused by retracing comprising:
    a. means for comparing the signals representing each position relative to each other to form a second series of signals comprising only those signals from said first series representing positions having an ordinate value more extreme that the corresponding ordinate value of the signals representing positions adjacent thereto,
    b. means for processing the first three signals in the second series of signals at that end of the stroke to determine which signal represents the end point,
    c. means for forming a third series of signals from said first series but starting with said signal corresponding to said end point.

8. Apparatus for processing a series of periodically occurring digital signal representing the positions of a stylus during a stroke on a digitizing tablet comprising:
    a. first memory means for storing said series of signals,
    b. first scanning means for controlling the transfer of signals to said first memory means so that said signals sequentially in accordance with their time of occurrence,
    c. peak detector unit means for comparing three successive signals at a time to determine if the second signal is more extreme than either the first or the third signal and outputting only such signals that meet such requirements, d. second scanning means for controlling the transfer of signals from the first memory means to the peak detector unit means, e. second memory means for holding the signals emitted by the peak detector unit means, f. third scanning means for controlling the transfer of signals from the peak detector unit means to the second memory means so that they are loaded therein sequentially, and g. means for processing the signals in the second memory means for determining the correct end points of the stroke, said means including an angle calculator, a pair of difference calculators, a ratio calculator, a table-look-up and a comparator.

* * * * *